United States Patent
Utley

(10) Patent No.: US 7,127,547 B2
(45) Date of Patent: Oct. 24, 2006

(54) PROCESSOR WITH MULTIPLE LINKED LIST STORAGE FEATURE

(75) Inventor: Robert H. Utley, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 372 days.

(21) Appl. No.: 10/675,717

(22) Filed: Sep. 30, 2003

(65) Prior Publication Data

US 2005/0086416 A1  Apr. 21, 2005

(51) Int. Cl.
*G06F 12/00* (2006.01)
*G11C 8/00* (2006.01)

(52) U.S. Cl. .................. 711/5; 711/127; 711/157; 365/230.03; 365/230.04

(58) Field of Classification Search ............ None
See application file for complete search history.

(56) References Cited

U.S. PATENT DOCUMENTS

| | | | |
|---|---|---|---|
| 6,373,846 B1 * | 4/2002 | Daniel et al. | 370/395.65 |
| 6,745,277 B1 * | 6/2004 | Lee et al. | 711/5 |
| 6,772,300 B1 * | 8/2004 | Manseau | 711/154 |
| 6,907,002 B1 * | 6/2005 | Beshai et al. | 370/230 |
| 2004/0123016 A1 * | 6/2004 | Doblar et al. | 711/5 |

OTHER PUBLICATIONS

U.S. Appl. No. 10/630,961, filed Jul. 30, 2003, R.A. Corley et al., "Processor Configured for Efficient Processing of Single-Cell Protocol Data Units."
U.S. Appl. No. 10/025,331, filed Dec. 19, 2001, G.A. Bouchard et al., "Dynamic Random Access Memory System with Bank Conflict Avoidance Feature."

* cited by examiner

*Primary Examiner*—Reginald Bragdon
*Assistant Examiner*—Shawn Gu

(57) ABSTRACT

A processor includes controller circuitry operative to control the storage of a plurality of separate linked list data structures for protocol data units received by the processor. The linked list data structures are stored in memory circuitry associated with the processor, and the memory circuitry is arranged in a plurality of banks. The plurality of banks are configured to store respective ones of the plurality of separate linked list data structures, such that each of the plurality of banks stores a corresponding one of the plurality of separate linked list data structures. The linked list data structures are accessed in an alternating manner that reduces the likelihood of access conflicts between the banks. The processor may be configured as a network processor integrated circuit to provide an interface between a network and a switch fabric in a router or switch.

16 Claims, 4 Drawing Sheets

300

PROCESSOR WITH MULTIPLE LINKED LIST STORAGE FEATURE

FIELD OF THE INVENTION

The present invention relates generally to data communication devices and systems, and more particularly to network processors or other types of processors utilizable in conjunction with processing operations, such as routing or switching, performed on packets or other protocol data units (PDUs).

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

Packets in the routing and switching context are also commonly referred to as PDUs, and are typically variable in size. However, a switch fabric is often configured to process data only in fixed-size units, commonly referred to as cells. A given PDU received at an ingress line card of a router or switch is therefore processed, under the control of a network processor, to separate it into cells suitable for processing in the switch fabric.

In order to keep track of which cells are associated with which PDUs, a linked list approach is typically used in which head and tail pointers are stored for each PDU being processed. The head pointer identifies in a data buffer the particular block that stores a first cell of the PDU. Similarly, the tail pointer identifies in the data buffer the particular block that stores a final cell of the PDU. The data buffer blocks are typically linked such that an entire PDU as stored in the data buffer is identifiable using only the head and tail pointers.

A conventional network processor typically utilizes a dynamic random access memory (DRAM) to store the linked list data structure. DRAMs are a preferred storage technology for use in conjunction with such network processors, in that DRAMs can provide a large storage capacity at a limited power consumption.

DRAMs within or otherwise associated with a network processor are typically arranged in the form of multiple memory banks. Consecutive read or write accesses to an address or addresses within a given one of the banks will require waiting a random cycle time Trc for completion of a required access pre-charge process. However, consecutive accesses to even the same address within different banks do not experience this Trc wait time, which is also referred to herein as the bank conflict penalty.

Static random access memories (SRAMs) avoid the bank conflict penalty altogether. That is, any address in the memory can be accessed in a fixed time without incurring the Trc wait time associated with DRAMs. The drawback of SRAMS, however, is that their storage capacity is typically an order of magnitude lower, and their power consumption is typically two orders of magnitude higher, relative to comparably-sized DRAMs.

A number of DRAMs known in the art are specifically configured to reduce the Trc wait time described above. For example, a so-called fast cycle DRAM (FCDRAM) is particularly designed to exhibit a minimal Trc. A more particular example of an FCDRAM, commercially available from Toshiba, is identified by part number TC59LM814CFT-50. In this particular type of FCDRAM, the random cycle time Trc is limited to 5T, where T denotes the memory clock period. A memory access, either read or write, requires two clock periods, and maximum data throughput is achieved by using a so-called "four-burst" mode. For example, using a 200 MHz memory clock and an FCDRAM configured in four banks, with each of the banks including 4M memory words of 16 bits each, the memory clock period T is 5 nanoseconds and Trc is 25 nanoseconds, and the maximum data throughput using the four-burst mode is approximately 6.4 Gigabits per second (Gbps). However, if consecutive memory accesses go to the same one of the four banks, the data throughput is reduced to approximately 2.5 Gbps, as a result of the Trc wait time.

U.S. patent application Ser. No. 10/025,331, filed Dec. 19, 2001 and entitled "Dynamic Random Access Memory System with Bank Conflict Avoidance Feature," which is commonly assigned herewith and incorporated by reference herein, discloses an improved DRAM-based memory architecture, for use in conjunction with a network processor or other processing device, which can provide the storage capacity and low power consumption advantages of DRAMs while also providing the advantage of SRAMs in terms of avoiding the problems associated with the above-described bank conflict penalty.

Despite the considerable advantages provided by the techniques described in the above-cited U.S. patent application Ser. No. 10/025,331, a need remains for further improvements, particularly in the storage, maintenance and other processing of a linked list when using a DRAM which comprises multiple memory banks.

More specifically, in situations in which the network processor is being utilized for high-rate processing of PDUs, memory latencies can increase significantly, to the point that linked list traversal becomes a hardware bottleneck that is further complicated by the inefficiencies commonly associated with DRAM. The conventional approach involving maintenance of a single linked list data structure for a given multi-bank DRAM is therefore problematic, and represents an undue limitation on the throughput performance of the processor.

SUMMARY OF THE INVENTION

The invention provides improved techniques for processing linked list data structures for PDUs in a network processor or other type of processor, in a manner that substantially reduces the bank conflict penalties typically associated with conventional linked list maintenance in a multiple-bank DRAM or other type of memory.

In accordance with one aspect of the invention, a network processor or other type of processor includes controller circuitry operative to control the storage of a plurality of separate linked list data structures for PDUs received by the processor. The linked list data structures are stored in memory circuitry associated with the processor, and the memory circuitry is arranged in a plurality of banks. For example, the memory circuitry may comprise an external multi-bank DRAM connectable to the processor. The plurality of banks of the multi-bank memory are configured to store respective ones of the plurality of separate linked list data structures, such that each of the plurality of banks stores a corresponding one of the plurality of separate linked list data structures. The linked list data structures are accessed in an alternating manner that reduces the likelihood of access conflicts between the banks. For example, the linked list data structures may be accessed in an alternating manner by accessing the corresponding memory banks sequentially in accordance with a round-robin selection algorithm.

In an illustrative embodiment, the memory circuitry comprises at least four distinct memory banks, each of the four memory banks storing a corresponding one of four separate linked list data structures. Block addresses associated with a given one of the linked list data structures share a common set of lower order bits which identify the corresponding memory bank in which the linked list data structure is stored. A particular linked list data structure to be accessed in a given access interval may therefore be determined based at least in part on one or more lower order address bits of block addresses associated with that linked list data structure. For example, in the four-bank illustrative embodiment, the two lowest order address bits may be used to identify a particular one of four memory banks to be accessed for a given access interval.

The processor may be configured as a network processor integrated circuit to provide an interface between a network and a switch fabric in a router or switch.

Advantageously, the techniques of the invention in the illustrative embodiment process received PDUs in a manner that prevents linked list traversal from becoming a hardware bottleneck, while also avoiding the inefficiencies commonly associated with multi-bank DRAM. As a result, processor performance and throughput are considerably improved.

DETAILED DESCRIPTION OF THE INVENTION

The invention will be illustrated herein in conjunction with an exemplary information processing system which includes a network processor configured in a particular manner. It should be understood, however, that the invention is more generally applicable to any processor in which it is desirable to provide more efficient processing of linked list data structures than is possible using the conventional techniques described above.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

The term "controller circuitry" as used herein is intended to include any portion of a processor or other type of logic or processing circuitry which is capable of performing or otherwise controlling at least a portion of a linked list maintenance operation or other type of linked list processing operation.

The term "memory circuitry" as used herein is intended to include a separate memory as well as a particular portion of a larger memory, and may refer to internal memory, external memory or combinations thereof.

The terms "protocol data unit" and "PDU" as used herein are intended to include a packet, or other identifiable grouping of information.

The present invention in an illustrative embodiment is configured such that a network processor includes controller circuitry configurable to control processing operations associated with maintenance of multiple linked list data structures for PDUs received by the network processor.

Figure 1:
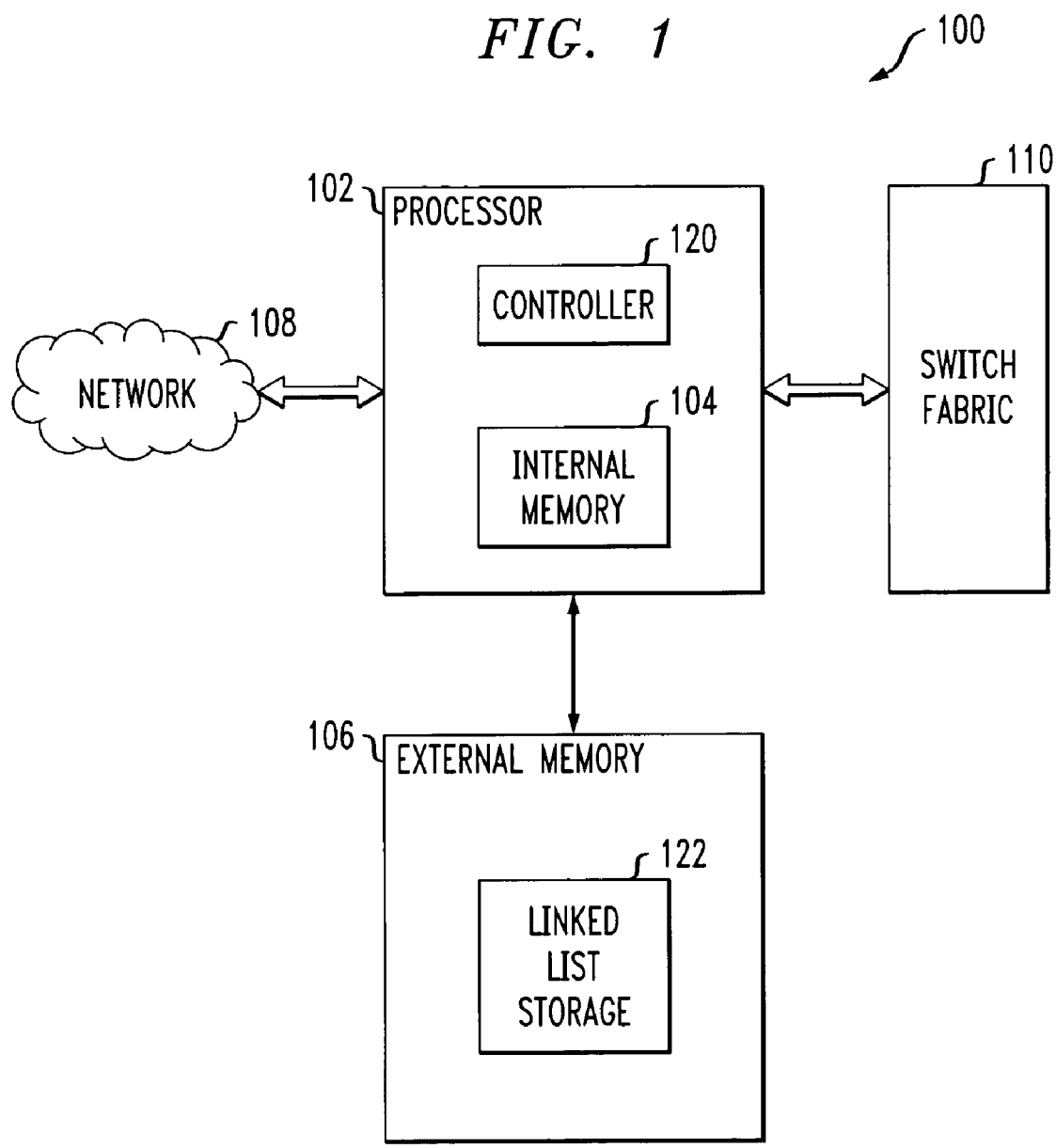
FIG. 1 is a simplified block diagram of an information processing system in which the present invention is implemented.

FIG. 1 shows an information processing system 100 in which the invention is implemented. The system 100 includes a network processor 102 having an internal memory 104. The network processor 102 is coupled to an external memory 106 as shown, and is configured to provide an interface between a network 108 from which PDUs are received and a switch fabric 110 which controls switching of PDU data. The processor 102 and its associated external memory 106 may be implemented, e.g., as one or more integrated circuits installed on a line card or port card of a router or switch. In such a configuration, the switch fabric 110 is generally considered to be a part of the router or switch.

One or both of the internal and external memories 104, 106 may be utilized to implement otherwise conventional network processor memory elements such as PDU buffer memory, queuing and dispatch buffer memory, etc.

In accordance with an aspect of the invention, the network processor 102 includes controller circuitry comprising a controller 120, and the external memory 106 includes a linked list storage portion 122, for storing block descriptors or other information characterizing PDUs, utilizing a linked list data structure. As will be described in greater detail below, the controller 120 is configurable for directing the storage, maintenance and other processing associated with linked list data structures stored in the external memory 106. Generally, the controller circuitry 120 is operative to control the storage of a plurality of separate linked list data structures for PDUs received by the processor. The linked list data structures are storable in memory circuitry associated with the processor.

In the illustrative embodiment, this memory circuitry comprises the linked list storage portion 122 of the external memory 106, and is assumed without limitation to comprise a DRAM arranged in a plurality of banks. Such a DRAM is also referred to herein as a "multi-bank DRAM." The plurality of banks are configured to store respective ones of the plurality of separate linked list data structures, such that each of the plurality of banks stores a corresponding one of the plurality of separate linked list data structures.

Although the external memory 106 is used for storage of linked list data structures in the illustrative embodiment, this is not a requirement of the invention. In other embodiments, the linked list storage may be the internal memory 104, or distributed across the internal memory 104 and the external memory 106.

It should be understood that the particular arrangement of system elements shown in FIG. 1 is by way of illustrative example only. More particularly, as previously noted, the invention can be implemented in any type of processor, and is not limited to any particular PDU processing application.

Also, the system 100 and network processor 102 may include other elements in addition to or in place of those specifically shown, including one or more elements of a type commonly found in a conventional implementation of such a system and network processor. For example, the network processor may include a classifier, a scheduler, queuing and dispatch logic, and/or other conventional elements not explicitly shown in the figure. These and other conventional elements, being well-understood by those skilled in the art, are not described in detail herein.

It is also to be appreciated that the network processor 102 as shown in FIG. 1 is considerably simplified for purposes of illustration, and in a given embodiment may include additional circuitry, such as one or more memory controllers, as well as appropriate interface circuitry for interfacing with the network 108, the switch fabric 110, and other external devices, such as an associated host processor or other device which communicates with the network processor 102 over a standard bus architecture, e.g., a peripheral component interconnect (PCI) bus.

Linked list storage, maintenance and other processing functionality of the network processor 102 as described herein may be implemented at least in part in the form of software program code. For example, the controller 120 may be implemented at least in part utilizing elements that are programmable via instructions or other software that may be supplied to the network processor 102 using conventional arrangements, such as the above-noted host processor.

The present invention may be advantageously configured so as to incorporate single-cell PDU processing techniques as described in U.S. patent application Ser. No. 10/630,961, filed Jul. 30, 2003 and entitled "Processor Configured for Efficient Processing of Single-Cell Protocol Data Units," which is commonly assigned herewith and incorporated by reference herein. It is often the case that a given PDU may be of a sufficiently small size that it can be processed in its entirety as a single cell, where the term "cell" in this context generally denotes a data unit suitable for processing in the switch fabric 110. Such PDUs are generally referred to as "single-cell PDUs." The term "single-cell PDU" as used herein is intended to include a PDU having a size which permits that PDU to be processed substantially in its entirety as a single cell within a switch fabric. A given single-cell PDU may therefore be substantially equivalent in size to a switch fabric cell, or smaller than a switch fabric cell.

In one embodiment of the invention disclosed in the above-cited U.S. patent application Ser. No. 10/630,961, a determination is made as to whether a given packet or other PDU received by the processor is a single-cell PDU. If the given received PDU is a single-cell PDU, information characterizing the given PDU is stored in an internal memory of the processor, without the use of a linked list data structure. Otherwise, information characterizing the PDU is stored in an external memory of the processor, utilizing a linked list data structure. This can significantly improve performance by avoiding access to an externally-stored linked list data structure when processing single-cell PDUs.

Figure 2:
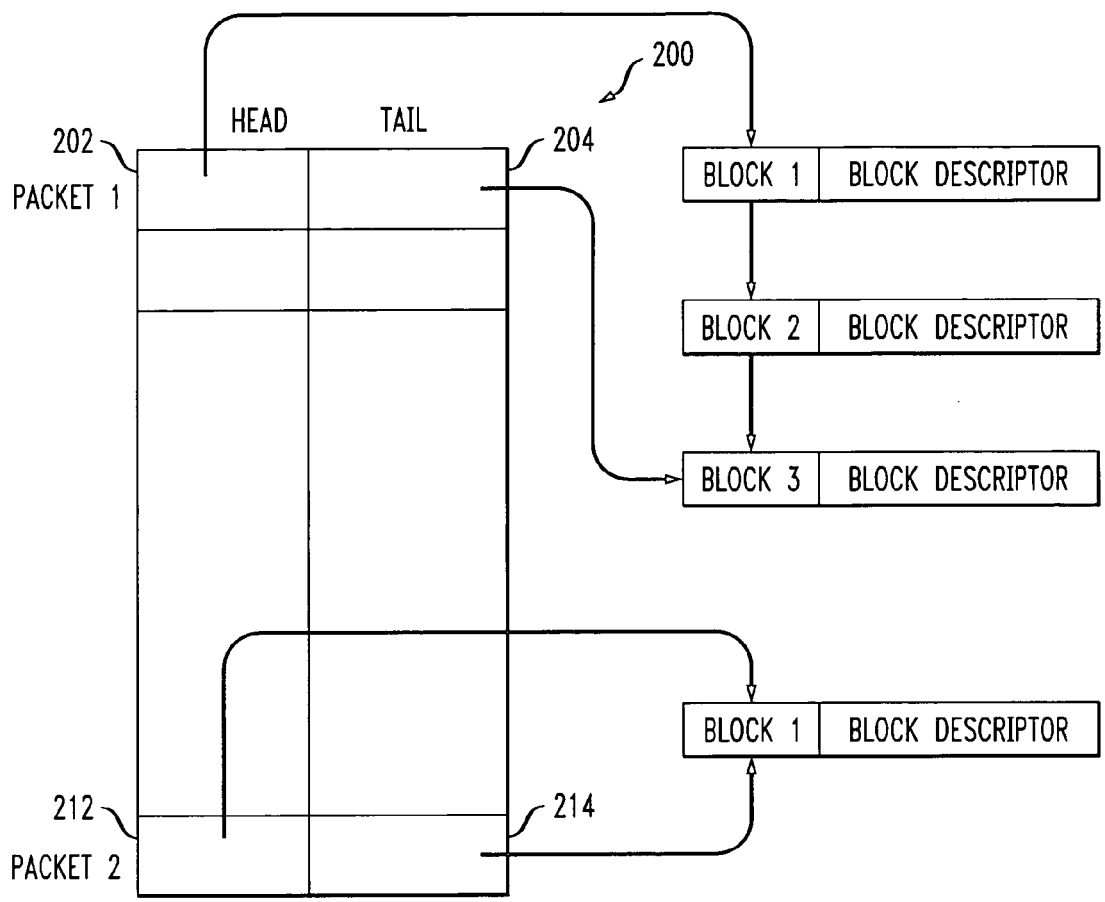
FIG. 2 shows an example linked list data structure that is utilizable for processing PDUs in the illustrative embodiment of the invention.

FIG. 2 shows an example linked list data structure that is utilizable for storing information characterizing multi-cell PDUs in the illustrative embodiment of the invention. In this example, a linked list data structure 200 includes a set of head pointers and a set of tail pointers. As indicated, a given multi-cell packet, denoted Packet 1 in the figure, includes a head pointer 202 and a tail pointer 204. The head pointer 202 identifies in a data buffer associated with network processor 102 the particular block, denoted Block 1, that stores a first cell of the multi-cell PDU Packet 1. Similarly, the tail pointer 204 identifies in the data buffer the particular block, denoted Block 3, that stores a final cell of the PDU Packet 1. Moreover, the particular data buffer blocks of Packet 1, namely Block 1, Block 2 and Block 3, are linked in the manner shown such that the entire multi-cell PDU as stored in the data buffer is identifiable using only the head and tail pointers 202, 204. Associated with each of the blocks is a corresponding block descriptor that includes block-level information for the corresponding stored PDU data.

The blocks and block descriptors for a multi-cell PDU may be configured and processed in a conventional manner, as will be appreciated by those skilled in the art. Their configuration and processing will therefore not be described in further detail herein.

Of course, this particular linked list data structure is presented by way of illustrative example only, and numerous other types of linked list data structures may be used in implementing the invention. The linked list data structure configuration as illustrated in FIG. 3B is another example of a linked list data structure suitable for use with the present invention.

For purposes of providing further illustration of the operation of the particular linked list data structure of FIG. 2, a single-cell PDU denoted Packet 2 is also shown in the figure. Application of the linked list data structure to this single-cell PDU results in a head pointer 212 and a tail pointer 214, both of which identify the same data block, denoted Block 1. Also, there is a single block descriptor associated with this data block.

It will be assumed without limitation that in the illustrative embodiment of the present invention, single-cell PDUs are treated in the manner described in the above-cited U.S. patent application Ser. No. 10/630,961. As a result, a linked list data structure such as that of FIG. 2 is not utilized in processing single-cell PDUs. The illustrative embodiment utilizes the linked list data structure of FIG. 2 only for processing multi-cell PDUs, with the single-cell PDUs being identified as such and handled in a manner which avoids the large number of memory accesses typically associated with maintenance of a linked list data structure. In other embodiments of the invention, the described techniques can be applied to both single-cell and multi-cell PDUs.

Figure 3A:
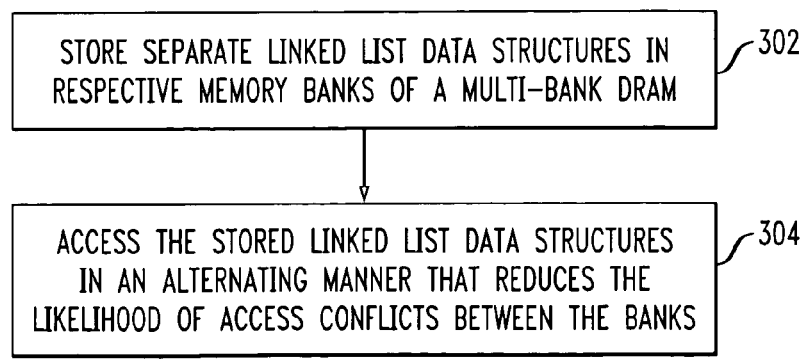
FIG. 3A is a flow diagram of PDU processing operations implemented in the FIG. 1 system in accordance with the techniques of the invention.
Figure 3B:
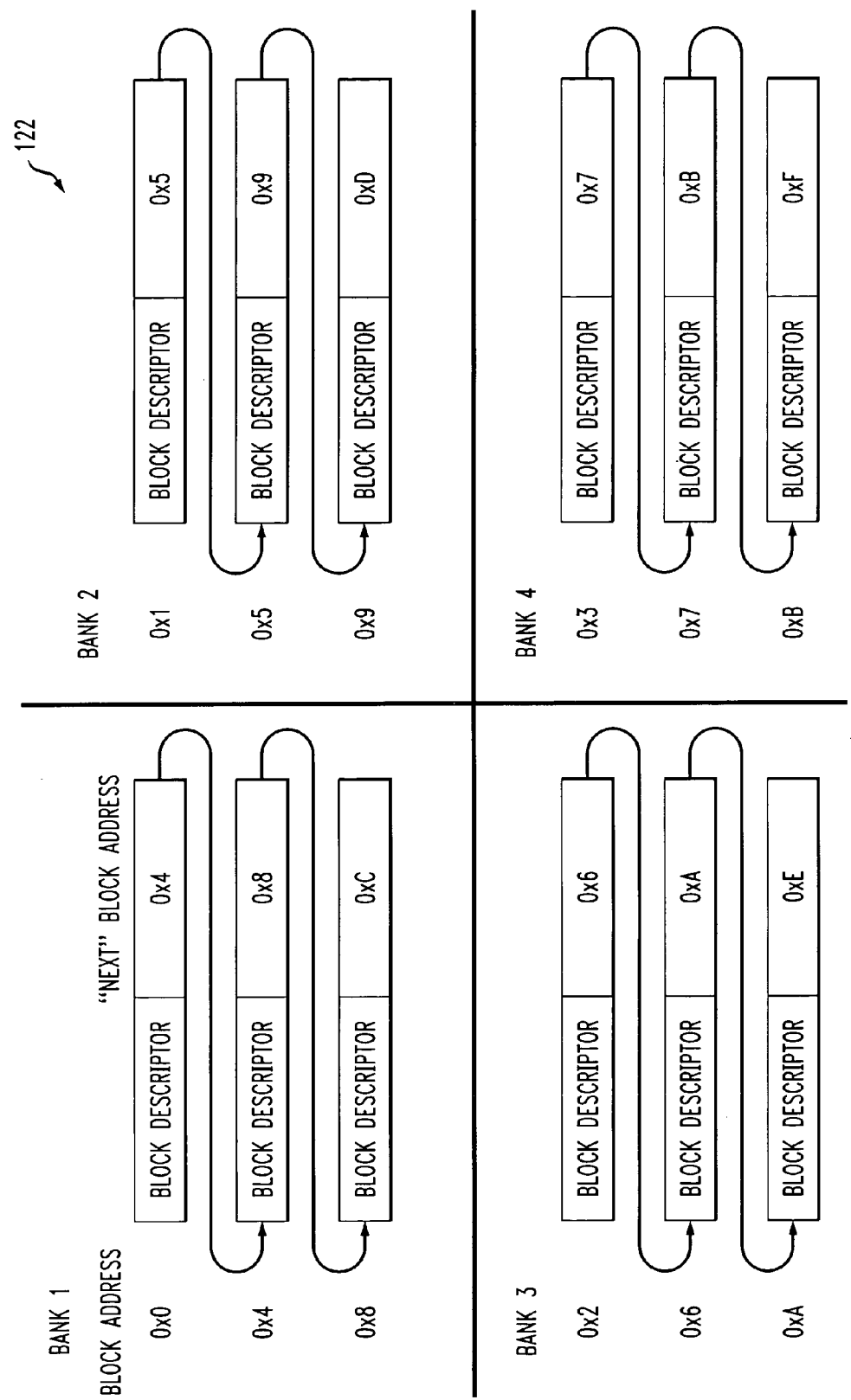
FIG. 3B shows an example of the storage of separate linked lists in separate memory banks of a multi-bank memory in the illustrative embodiment of the invention.

FIG. 3A is a flow diagram 300 which illustrates PDU processing operations implemented in the network processor 102 in accordance with the invention.

In step 302, separate linked list data structures are stored in respective memory banks of a multi-bank DRAM. As noted previously, the linked list storage portion 122 of external memory 106 is assumed to comprise this multi-bank DRAM. Each of a plurality of memory banks of the multi-bank DRAM thus stores a corresponding one of the plurality of separate linked list data structures.

In step 304, the linked list data structures are accessed in an alternating manner that reduces the likelihood of access conflicts between the banks, relative to the conventional approach in which a single linked list data structure is stored across multiple banks of a multi-bank DRAM.

The linked list data structures may be accessed in an alternating manner by, for example, accessing the corresponding memory banks sequentially in accordance with a round-robin selection algorithm. Other types of selection algorithms may also be used, as will be readily appreciated by those skilled in the art.

The particular steps shown in FIG. 3A should be considered as examples of PDU processing operations in accordance with the illustrative embodiment of FIGS. 1 and 2, rather than as limiting the scope of the invention in any way.

FIG. 3B shows an example of the manner in which the linked list storage portion 122 of the external memory 106 may be arranged in multiple banks in accordance with the techniques of the invention. It should be noted that the linked list data structures shown in this example differ slightly from the structure shown FIG. 2, but serve substantially the same function for the processor in terms of providing an efficient mechanism for tracking the storage of particular PDUs.

In this example, the linked list storage portion 122 comprises a multi-bank DRAM arranged in four distinct memory banks, denoted Bank 1, Bank 2, Bank 3 and Bank 4, with each of the four memory banks storing a corresponding one of four separate linked list data structures. The invention does not require the use of this or any other particular number of memory banks, and more or fewer banks may be used in other embodiments.

The linked list data structures as shown in this example each include three entries, with each entry having a block descriptor, block address and next block address associated therewith. Of course, this is for clarity and simplicity of illustration only, and the different linked list data structures may each include different numbers of entries in practice.

Each of the linked list data structures preferably represents a separate and independent linked list, capable of being processed using conventional linked list processing techniques of a type well-known to those skilled in the art. The controller 120 may be configured to include circuitry for performing such conventional aspects of linked list processing, with this otherwise conventional circuitry being suitably modified in a straightforward manner to provide the enhanced functionality associated with the present invention.

In the four-bank example of FIG. 3B, the banks may be accessed sequentially in the order Bank 1, Bank 2, Bank 3, Bank 4, Bank 1, and so on in round-robin fashion such that bank conflicts may be avoided altogether for a given access sequence. In contrast, use of conventional storage of a single linked list data structure across multiple banks will be likely to result in a bank conflict situation.

The block addresses associated with a given one of the linked list data structures share a common set of lower order bits which identify the corresponding memory bank in which the linked list data structure is stored. For example, with reference to Bank 1, the two lowest order bits of the block addresses thereof are '00'. Similarly, the two lowest order bits of the block addresses of Bank 2, Bank 3 and Bank 4 are '01', '10' and '11', respectively. A particular linked list data structure to be accessed in a given read or write access interval may therefore be determined in this example based at least in part on the two lowest order bits of the block addresses associated with that linked list data structure. More specifically, the two lowest order address bits are used to identify a particular one of four memory banks to be accessed for a given access interval. These two lowest order address bits, specifying a particular one of the four banks, may thus be viewed as representing a bank address in the illustrative embodiment.

Advantageously, the use of different DRAM memory banks to store separate linked list data structures can significantly reduce the likelihood of bank conflicts, since the different linked list data structures can be accessed sequentially in a manner which avoids such conflicts. This reduces memory bus stalls and improves processor throughput. Moreover, the arrangements described above substantially increase the speed with which the processor can allocate particular blocks to the linked list data structures. For example, the processor does not have to wait for the next pointer from a given linked list data structure in order to allocate another block, since it can go directly to another linked list structure to determine a free buffer location.

Figure 4:
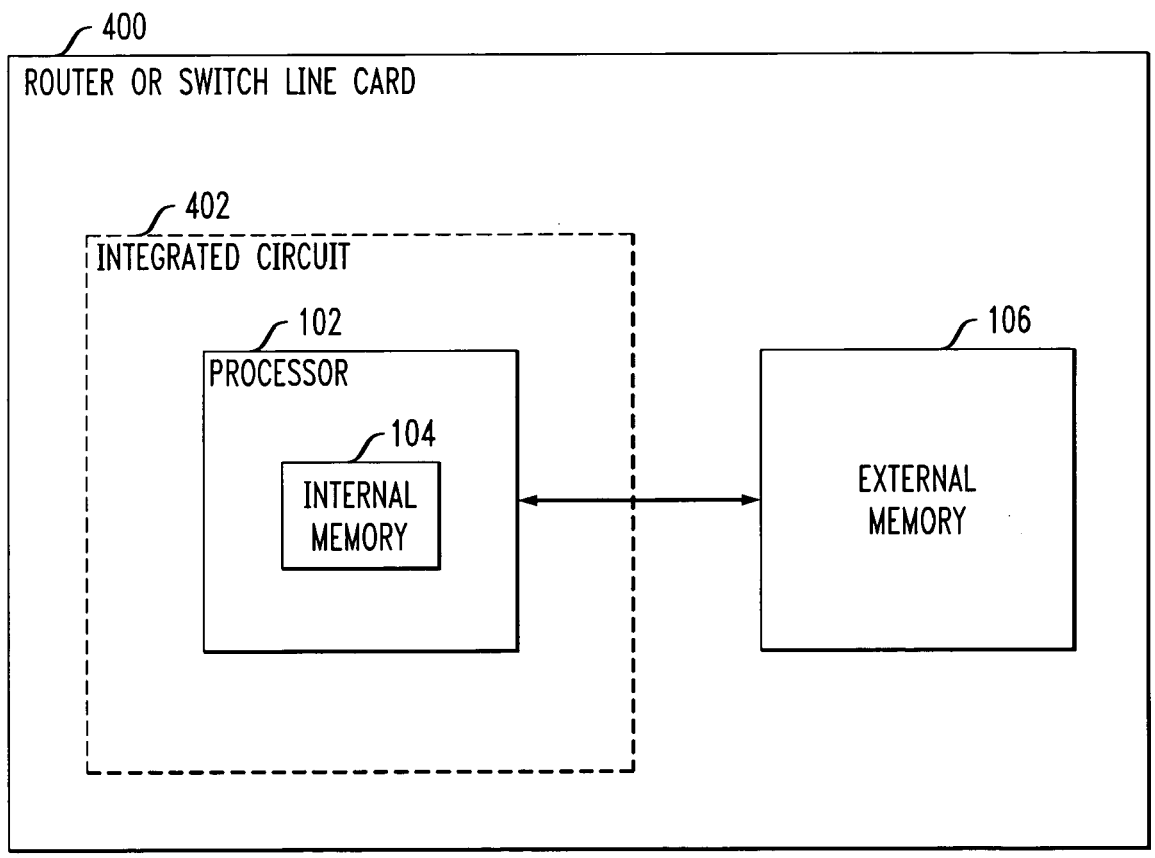
FIG. 4 illustrates one possible implementation of a network processor of the FIG. 1 system as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The external memory 106 includes the above-described linked list storage portion 122, and may also be used for other functions, for example, it may serve as an external tree memory for the network processor integrated circuit. The above-noted host processor may also be installed on the line card 400. The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card in a router or switch.

The above-described embodiments of the invention are intended to be illustrative only. For example, although the illustrative embodiment of FIG. 1 utilizes controller 120 in implementing processing operations associated with linked list storage and maintenance for received PDUs, other embodiments may utilize different types of controller circuitry for implementing such operations. In addition, other embodiments can use different types of internal or external memory circuitry configurations for implementing the described functionality. Furthermore, the use of block descriptors as characterizing information for the data blocks of PDUs is purely by way of example, and other types of characterizing information may be used. As mentioned previously, the invention can utilize linked list data structures different than those specifically described herein for storage of block descriptors or other PDU characterizing information. These and numerous other alternative embodiments within the scope of the following claims will be readily apparent to those skilled in the art.

What is claimed is:

1. A processor comprising:
   controller circuitry operative to control the storage of a plurality of separate linked list data structures for protocol data units received by the processor;
   the linked list data structures being storable in memory circuitry associated with the processor;
   wherein the memory circuitry is arranged in a plurality of banks, the plurality of banks being configured to store respective ones of the plurality of separate linked list data structures, such that each of the plurality of banks stores a corresponding one of the plurality of separate linked list data structures;
   wherein the linked list data structures are accessed in an alternating manner that avoids access conflicts between the banks; and
   wherein a given one of the linked list data structures comprises a plurality of entries each having a block descriptor and at least one block address associated therewith.

2. The processor of claim 1 wherein at least a portion of the memory circuitry associated with the processor comprises an external memory connectable to the processor.

3. The processor of claim 1 wherein at least a portion of the memory circuitry associated with the processor comprises an internal memory of the processor.

4. The processor of claim 1 wherein the memory circuitry comprises a dynamic random access memory (DRAM).

5. The processor of claim 1 wherein the memory circuitry comprises at least four distinct memory banks, each of the four memory banks storing a corresponding one of four separate linked list data structures.

6. The processor of claim 1 wherein the linked list data structures are accessed in an alternating manner by accessing the corresponding memory banks sequentially in accordance with a round-robin selection algorithm.

7. The processor of claim 1 wherein the protocol data unit comprises a packet.

8. The processor of claim 1 wherein a given one of the block descriptors is associated with a particular data block of a given protocol data unit.

9. The processor of claim 1 wherein the processor is configured to provide an interface for communication of the received protocol data units between a network and a switch fabric.

10. The processor of claim 1 wherein the processor comprises a network processor.

11. The processor of claim 1 wherein the processor is configured as an integrated circuit.

12. A processor comprising:
controller circuitry operative to control the storage of a plurality of separate linked list data structures for protocol data units received by the processor;
the linked list data structures being storable in memory circuitry associated with the processor;
wherein the memory circuitry is arranged in a plurality of banks, the plurality of banks being configured to store respective ones of the plurality of separate linked list data structures, such that each of the plurality of banks stores a corresponding one of the plurality of separate linked list data structures;
wherein the linked list data structures are accessed in an alternating manner that avoids access conflicts between the banks; and
wherein block addresses associated with a given one of the linked list data structures share a common set of lower order bits which identify the corresponding memory bank in which the linked list data structure is stored.

13. A processor comprising:
controller circuitry operative to control the storage of a plurality of separate linked list data structures for protocol data units received by the processor;
the linked list data structures being storable in memory circuitry associated with the processor;
wherein the memory circuitry is arranged in a plurality of banks, the plurality of banks being configured to store respective ones of the plurality of separate linked list data structures, such that each of the plurality of banks stores a corresponding one of the plurality of separate linked list data structures;
wherein the linked list data structures are accessed in an alternating manner that avoids access conflicts between the banks; and
wherein a particular linked list data structure to be accessed in a given access interval is determined based at least in part on one or more lower order address bits of block addresses associated with that linked list data structure.

14. The processor of claim 13 wherein the two lowest order address bits are used to identify a particular one of four memory banks to be accessed for a given access interval.

15. A method for use in a processor comprising controller circuitry, the method comprising the steps of:
storing in memory circuitry associated with the processor a plurality of separate linked list data structures for protocol data units received by the processor, wherein the memory circuitry is arranged in a plurality of banks, the plurality of banks being configured to store respective ones of the plurality of separate linked list data structures, such that each of the plurality of banks stores a corresponding one of the plurality of separate linked list data structures; and
accessing the linked list data structures in an alternating manner that avoids access conflicts between the banks;
wherein a given one of the linked list data structures comprises a plurality of entries each having a block descriptor and at least one block address associated therewith.

16. An article of manufacture comprising a machine-readable storage medium having program code stored thereon for use in a processor comprising controller circuitry, the program code when executed in the processor implementing the steps of:
storing in memory circuitry associated with the processor a plurality of separate linked list data structures for protocol data units received by the processor, wherein the memory circuitry is arranged in a plurality of banks, the plurality of banks being configured to store respective ones of the plurality of separate linked list data structures, such that each of the plurality of banks stores a corresponding one of the plurality of separate linked list data structures; and
accessing the linked list data structures in an alternating manner that avoids access conflicts between the banks;
wherein a given one of the linked list data structures comprises a plurality of entries each having a block descriptor and at least one block address associated therewith.

* * * * *